United States Patent

Nye et al.

[15] 3,705,961

[45] Dec. 12, 1972

[54] RECORDER-TRANSCRIBER SWITCHING APPARATUS

[72] Inventors: William M. Nye, Seattle; Stanley W. Jones, Bellevue, both of Wash.

[73] Assignee: Lanier Electronic Laboratory, Inc., Atlanta, Ga.

[22] Filed: June 24, 1970

[21] Appl. No.: 49,432

[52] U.S. Cl. ..........................179/100.1 DR, 179/6 E

[51] Int. Cl. .......................G11b 15/06, H04m 11/10

[58] Field of Search......179/100.1 DR, bE, 100.4 PT; 346/44

[56] References Cited

UNITED STATES PATENTS

| | | | |
|---|---|---|---|
| 3,474,455 | 10/1969 | Summers | 179/100.1 DR |
| 3,086,086 | 4/1963 | Ernst | 179/100.4 PT |

*Primary Examiner*—Bernard Konick
*Assistant Examiner*—Raymond F. Cardillo, Jr.
*Attorney*—Jones and Thomas

[57] ABSTRACT

An automatic standby device makes a recorder-transcriber unavailable to a subsequent dictator when the dictated but untranscribed tape in the recorder-transcriber exceeds a predetermined percent of its usable capacity. The device makes the recorder-transcriber automatically available for subsequent dictation when the amount of used percentage of capacity of the machine drops to a predetermined smaller percent of capacity, when all other available recorder-transcribers are in use, or when all other recorder-transcribers are full. Another feature is that every other pulse of a rectified standard 60-cycle per second current is utilized, with the pulses spaced by a time interval sufficient to allow the control circuits and mechanical movements in both the switching apparatus and recorder-transcriber to effectively seize an available recorder-transcriber prior to the next pulse. The dictate station energizes a stepping circuit when the handset is raised (off-hook condition) only after a predetermined delay to preclude the stepping circuit from responding to simultaneous off-hook signals from multiple dictate stations. Only a portion of the rectified 60-cycle voltage is utilized in the control circuits so that the maximum voltage capability of the transistor components in the circuits is not exceeded.

10 Claims, 3 Drawing Figures

DISTRIBUTION PANEL

INVENTORS
WILLIAM M. NYE
STANLEY W. JONES
BY Seed, Berry & Dowrey
ATTORNEYS

INVENTORS
WILLIAM M. NYE
STANLEY W. JONES
BY
ATTORNEYS

RECORDER-TRANSCRIBER SWITCHING APPARATUS

BACKGROUND OF THE INVENTION

1. Field of the Invention

This invention relates to business dictating systems of the type employing an endless tape recording-transcribing machine and remote dictating and transcribing stations. Recording-transcribing systems of the type to which the present invention is specifically directed are described in U. S. Pats. Nos. 2,988,604 and 2,989,594. More particularly, this invention pertains to switching apparatus for selectively interconnecting a plurality of recorder-transcribers (hereinafter called recorders) with a plurality of dictate stations positioned at remote locations from the recorders.

2. Description of the Prior Art

The recorder-transcriber employed in these systems is a continuous-flow tape recorder-playback unit designed for complete remote-control simultaneously or separately from a dictate station and from a transcribe station. The recorder-transcriber comprises one or more tape-holding bins designed to hold loosely folded sections of an endless magnetic recording tape several hundred feet in length, a tape transporting mechanism designed to move sections of the tape past recording and reproducing heads in response to control signals received from dictate and transcribe stations, and appropriate electrical or electronic circuitry necessary for operating the tape transport mechanism, and for recording information on and reproducing information from the tape. Heretofore, switching devices for selectively interconnecting recorders and dictate stations in associated circuits of this type have utilized numerous relays which are susceptible to malfunctions from dirty contacts and produce electrical interference, therefore being heard by dictators using the equipment.

Heretofore, standby operation of recorders has required continual monitoring by a supervisor who disconnected a desired recorder, thus making it unavailable for subsequent dictation. The only automatic device for making a machine unavailable due to the percentage of its capacity used, has required making the machine totally unavailable for dictation until the percentage of its capacity used has dropped to some smaller per cent. This was commonly referred to as a "lock out" and, even though all other available machines were in use or filled, the machine locked out could not be made available regardless, until the smaller percentage of capacity was reached. This resulted in the remaining capacity of the machine never being available in times of system overload.

SUMMARY OF THE INVENTION

It is an object of this invention to provide an automatic standby device which will make a machine unavailable for subsequent dictation when the capacity of the machine reaches some predetermined per cent of the machine's capacity. The machine will remain unavailable until all other available machines are in use or filled, or until the per cent of capacity in this particular machine drops below some smaller per cent of capacity.

In the preferred form of the invention, a two-position switch is employed, which is positioned by a capacity-sensing means which indicates the used capacity of the machine. This switch is interconnected into control circuitry for the recorder so that it is made unavailable for subsequent dictation until the switch is again moved to a position indicating a smaller percent used capacity of the machine, or until the control circuitry signals that all other available machines are in use or filled.

It is another object of this invention to provide an automatic switching apparatus that is easy to operate and maintain, utilizing every other pulse of a rectified standard 60cps voltage to allow seizure between pulses, and effectively interconnects dictate stations to any available recorder in the shortest possible time.

It is another object of this invention to provide a switching apparatus which utilizes inexpensive standard power sources for timing stepping motors in searching for available recorders and/or off-hook dictate stations.

It is another object of the invention to provide a switching apparatus which utilizes available voltages in a unique manner to assure that the voltages in the control circuits do not exceed the allowable specifications of the electronic components utilized, and yet provide adequate voltages for proper operation of stepping switches.

It is still another object of the invention to provide a delay after a handset is moved off-hook so that multiple off-hook stations do not result in continuous searching.

It is another object to provide accurate voltages for critical timing sequences from a wide range of voltages so that the dictator may seize a recorder in the shortest possible time, and without interference to other dictators.

DESCRIPTION OF THE PREFERRED EMBODIMENTS

Figure 1:
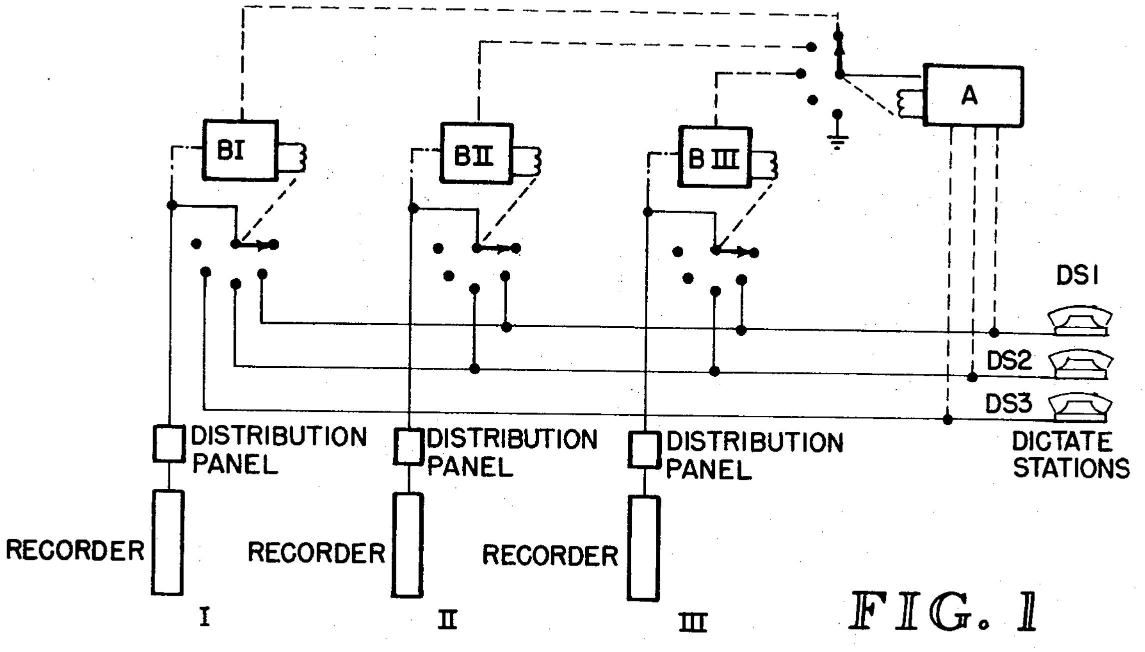
FIG. 1 is a basic block diagram illustrating the preferred switching system embodying the principles of the invention.
Figure 3:
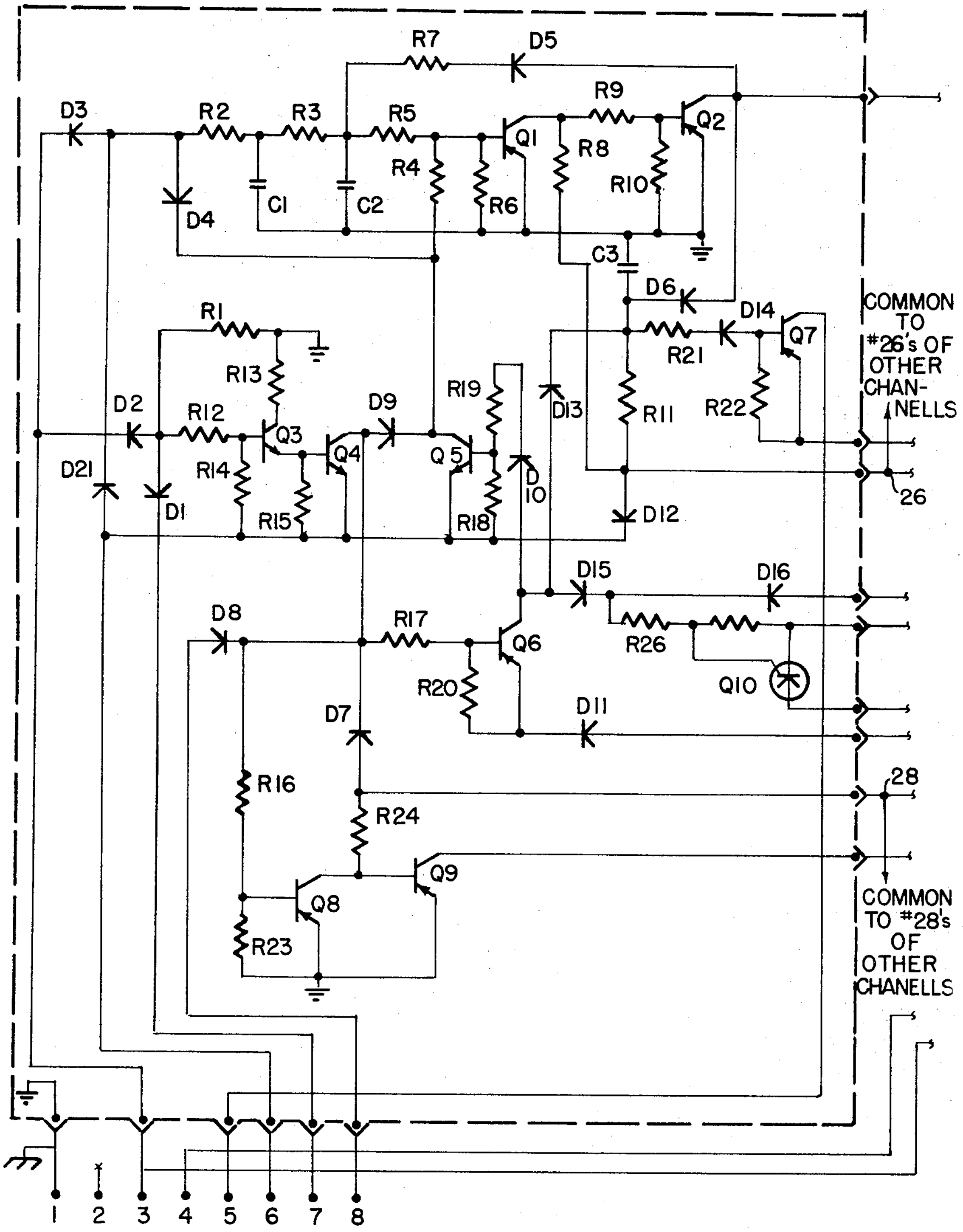
FIG. 3 is a wiring schematic for a switching apparatus embodying the principles of this invention.

As best shown in FIG. 1, the automatic switching apparatus is best employed for secretarial pool type installations to connect a large number of dictate stations to a plurality of recorders. Whereas only three recorders, namely, I, II and III, and three dictate stations, namely DS1, DS2 and DS3, are shown, it should be understood that larger numbers of recorders an/or dictate stations may be employed. A block diagram of FIG. 1 illustrates the basic mode of operation of the switching apparatus. When a dictate station handset is raised, i.e., made off-hook, a signal is sent to the search-circuit A to step two ganged arms A1, A2 over contacts connected to various recorder channels I, II, III, etc. Once the switch arms reach contacts connected to an available recorder, a signal is sent to a dictate station stepping switch control circuit BI, BII, BIII or etc. associated with that recorder to cause that stepping switch to search for the off-hook dictate station. Once the off-hook dictate station contacts on the dictate station stepper switch are reached, the recorder is seized resulting in a signal to the search circuit A to advance to the next available channel. In other words, there is one search circuit recorder stepping switch A for the switching apparatus, and a dictate station stepping switch B for each channel or recorder. In FIG. 3, only one of the dictate station stepping switches, namely BI, is illustrated for clarity, it being understood that the remaining dictate station stepping switches operate in an identical manner.

Figure 2:
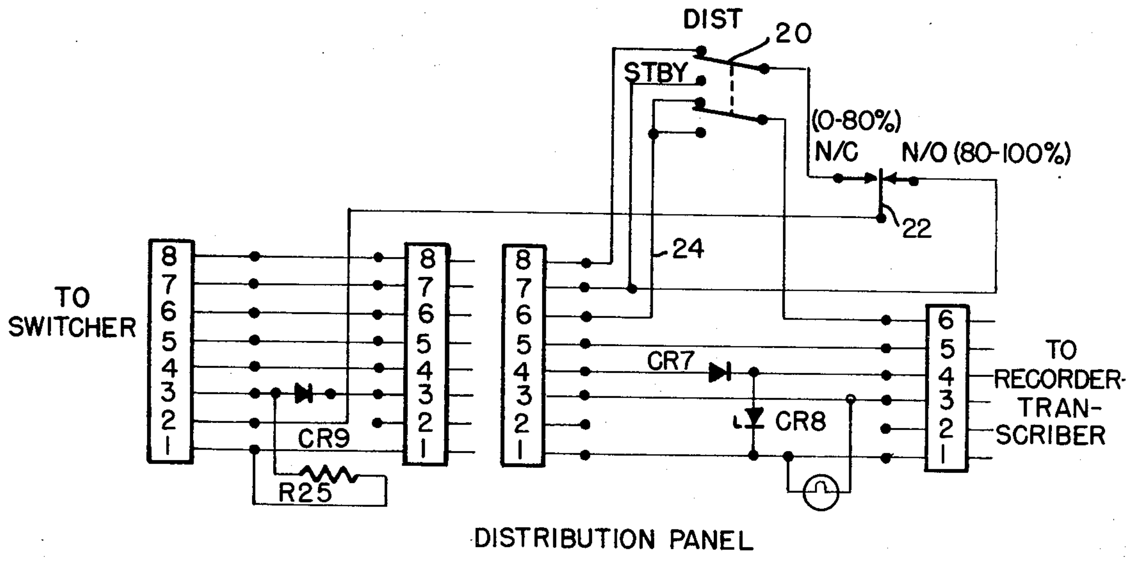
FIG. 2 is a wiring schematic illustrating the automatic standby feature of the invention, it being understood that this wiring is interconnected between the switcher illustrated in FIG. 3 and a recorder.

In FIG. 2, a manually operated distribute standby switch 20 and an automatic standby switch 22 are illustrated. The terminals 1—8, going "to switcher" in FIG. 2, are connected to terminals 1—8 of the switching circuit shown in FIG. 3. The terminals 1—6 "to recorder" in FIG. 2 are connected to a recorder in a manner to provide the various functions to be described. The automatic standby switch 22, in the preferred embodiment, is a two-position switch that is energized by a sensing means (not shown) which indicates the amount of dictated, but untranscribed, tape in a particular recorder. The sensing means may be of any suitable type having sufficient power to position the switch contacts such as by using a relay in which the switch contacts of the automatic standby switch 22 are relay contacts. Record-transcribe apparatus including apparatus for sensing a predetermined amount of recorded but untranscribed tape is shown, for example, in applicants' copending application Ser. No. 60,285, filed Aug. 3, 1970. Assuming the capacity of a machine is 100 percent, the sensing means will be made to place the switch arm of the switch 22 in the position shown when the used capacity of the machine is less than some predetermined percent, such as 80 percent, and will move the switch arm to the right, as shown in FIG. 2, when the used capacity of the machine is over 80 per cent. As will be described in more detail hereinafter, it is the purpose of this automatic standby switch to make the recorder unavailable for subsequent dictation when the position of the switch is at the right unless all other machines are in use or are full.

In FIG. 2, the manual distribution-standby switch 20 is shown in the distribution mode. With the recorder on, minus 24 volts from the recorder's No. 6 lead is supplied through conductor 24, distributor-standby switch 20 to Q3, Q4, and through D12 to line 26, and out to terminal 15. Terminals 10, 11, 12, 13, 14 and 15 are connected to each of the dictate stations in parallel. Q3 turns on with ground through R1 and R12 to its base. Q3 turns Q4 on. Q4 turns on Q8, and supplies −24v. to conductor terminal 8. Q8's conduction keeps Q9 off, so recorder stepping switch A will not step. Minus 24v. supplied through D8 of terminal 8 goes out of the switch arm of the manual switch 20 and, since the arms of these switches (one switch per channel) are tied together through common terminal 2, −24v. is present on the arm of every other channel. If the switch arm in the switch 20 of another channel is in standby position, the lower position as shown in FIG. 2, −24v. will be applied to terminals 7 of that channel, through D1, holding Q3 and Q4 of that channel off. With Q4 off, Q8 will be off, so Q9 can turn on causing the recorder stepping switch A to step by this standby channel. If all channels having their manual switches 20 in the distribute mode are in use, −24v. is removed from the arms of the manual switches 20. This allows Q3, Q4, and Q8 of the standby channels, to turn on. With the Q8's on, Q9's will turn off, allowing the recorder stepping switch A to stop on the standby channels. If a recorder is full, the recorder No. 6 terminal will be 0v., so that Q3 and Q4 will be off, and Q9 will be permitted to turn on. If the recorder is in use by another dictate station, recorder No. 3 terminal is at −24v., due to internal circuitry in the recorder, and will apply this voltage through D2, turning off Q3 and Q4. Common −24v. from conductors 26 is applied to emitter of Q17, and also to No. 15 terminals of the dictate stations. If common conductors 28 become 0v. (all channels in use), Q17 conducts from emitter to base, through Z2, D29, and R41 to ground. This causes Q17 to conduct from emitter to collector, apply −24v. through D27 to terminal 12 of the dictate station.

SEARCHING FOR DICTATE STATIONS

Lifting the handset from the cradle in a dictate station (off-hook), connects a load (in dictate station as shown in dotted lines 30) from No. 14 terminal to No. 10 terminal. This allows a ground to be coupled through the load 30 and through R 40 to base of Q18, turning it on. Q18 supplies −18v. through R38 to charge capacitor C5. When C5 is charged to about −13v., it causes current flow through D22, B17, and R28, turning on Q13. Q13 turns on Q12 which turns on Q14, applying ground from collector of Q14 through stepper switch contact A2. This ground is coupled through D11, Q6, D15, and R26 to the gate of SCRQ10, turning it on. When Q10 is on, AC from the 48v. tap of a transformer T2 flows through Q10, through coil B1, through Q19, to the 24v. tap of T1. Thus 72v. rectified AC is applied to coil B1 (dictate station stepping switch) causing the switch arm to step. The speed of the stepping switch is 30 cps and is regulated by Q19, which is controlled by a frequency divider circuit. An important feature of this invention is that an available 60 cps voltage is utilized to provide sufficient voltage to drive the stepping motors, but is divided so that only every other rectified half-cycle is employed. This spaced the pulses to the stepping motors to a speed of 30 cycles per second, which allows the electrical components of the remaining control circuits and mechanical movements to complete their functions prior to the stepping motor's receiving the next pulse. Another important feature is the relationship of the capacitors C5, one for each dictate station, to the timing of the stepping rate. Since several hand sets may be off-hook simultaneously the charge rate of the capacitors must be less than the time required for one revolution of the stepping switch. This assures that the switch will lock on the last capacitor in the sequence prior to iniation of another revolution.

Before searching, Q6 has minus volts applied to its base through R17, from the collector of Q4. During search, Q5 turns on, supplying minus volts through D9 to R17, and also through R4, which turns on Q1, disabling a homing circuit, to be described. During search, the collector of Q6 also supplies ground through D12 to turn off Q7, which opens a connection from recorder No. 5 lead through the dictate station stepping switch B1, to No. 14 terminal of the dictate station, to prevent connection to the wrong station. In this regard terminal No. 14 must be −24v. and terminal No. 3 must be ground for seizure. When the dictate station stepping switch B1 reaches a station off-hook, the arm connected to terminal 10 discharges capacitor C5 which turns off the search circuit. The dictate station at this time is connected to a recorder. It is important to note that the −18v. supplied to the emitter of Q18 comes from Q11, which is held at a constant 18v. regardless of the voltage supplied through the conductors 28, which may vary widely, depending upon the number and type and spacing of the other recorders. The −18v. is supplied whenever there is a channel available and 0v. when all channels are in use.

SEIZING RECORDER-TRANSCRIBER

When the off-hook dictate station seizes the recorder, −24v. is supplied to the recorder No. 3 terminal through D3, to junction of R2, D2, and D21. Minus 24v. through D21 and D12 supplies power to the collector of Q1. Minus 24v. through D2 turns off Q3. Minus 24v. through R2 charges C1 and turns on Q1 through R3 and R5, which disables the homing circuit, to be described. Also, when recorder is seized, Q9 is allowed to turn on, supplying a ground to stepping switch arm A1. (Q9 turns on because Q3, Q4, Q8 are off.) The ground on the switch arm A1 is passed through D19 and R36, turning on SCRQ16. When Q16 is on, rectified AC voltage from the 48v. tap of transformer T2 flows through Q16, through stepper switch A coil, through Q19, to the 24v. tap of T1. Seventy-two volts rectified AC is applied to coil A, causing the switch to step to the next available channel. If all channels are in use, the stepping switch does not step. It is important to note, that although 72v. rectified AC is made available to step the stepping switch, the transistor components of the circuit see only 24v. Ac, 35v. peak, and thus standard transistors may be used throughout.

SWITCHING APPARATUS GOING HOME

When the dictate station is hung-up after use, a recorder is unseized, removing the −24v. from the recorder No. 3 terminal. C1 begins discharging through R3, R5, and Q1 base to emitter, keeping Q1 turned on for approximately 2—8 seconds, which keeps Q2 (homing circuit) off for the same amount of time. When C1 is discharged, Q1 turns off, allowing Q2 to turn on, supplying a ground through the homing switch 34, turning on Q10, which steps the stepping switch. The switch steps until it reaches home position (a set of contacts with no dictate station terminals connected), at which time a mechanical arm opens the homing switch. D5 and R7 provide a feed-back path from the collector of Q2 to C1, through R3. When Q2 begins to turn on, it helps C1 discharge faster, to insure Q1 turns off quickly and completely. While the stepping switch B1 is stepping toward home, Q2 supplies a ground through D6, turning off Q7, which opens a connection from the recorder No. 5 terminal to the dictate station stepping switch arm connected to No. 14 terminal. This prevents connection to any dictate stations in use on another recorder. If the recorder is filled, while dictating, −24v. is removed from the recorder No.'s 6 and 3 terminals. C1 discharges rapidly, through D21, sending the stepping switch B1 home. The next available recorder then searches for a dictate station.

Returning now to the automatic standby feature of invention, it will be noted that a channel is available for seizure by a dictate station when Q3 and Q4 are on, applying a −24v. to conductor 27, The several conditions, already mentioned, when conductor 28 is at 0v., namely when Q3 and Q4 are off, occur when a machine is full ( 6 terminal 0v.), when a recorder is in use (No. 3 terminal at −24v.), or the manual switch 20 for that channel is in standby position, and another channel is available for use (terminal 7 at −24v. from terminal 8 through switch arm of distribution switch 20—all channels No. 2 terminal connected to the switch arm). It was also seen that if the No. 8 terminal was 0v. because all available recorders were in use or filled, the −24v. would not appear at the No. 7 terminal of the channel in the manual standby mode, thus allowing the recorder stepping switch A to now stop on that standby channel.

In the automatic standby switch 22, the common No. 2 terminal connected to the switch arm of the manual distribution switches 20, is connected through the switch contacts of the automatic standby switch 22 to the No. 8 terminal if the manual switch is in the distribute mode, or to the No. 7,terminal if in the standby mode. If the manual switch is in the distribute mode and the predetermined capacity of the recorder has not been reached so that the switch contacts of the automatic standby switch 22 are in the position shown, the channel functions as previously described in the distribute mode. If the manual switch 20 is in the standby mode, the recorder functions as in the standby mode previously described. In either mode, when the switch contacts of the switch 22 are moved to the right in response to the sensing means in the recorder, indicating that a predetermined percentage of the capacity of the recorder has been used, the terminal No. 2 is connected directly to terminal No. 7, thus automatically placing the recorder in the previously described standby mode. If all other available recorders are in use or full at this time, however −24v. is removed from terminal No. 2 and so the standby-mode established by movement of switch 22 to the right is overridden and the recorder becomes available for seizure and subsequent dictation. It should be readily apparent that use of an automatic standby as described eliminates the need for a supervisor to monitor the capacity conditions of each of the recorders, and optimizes the available capacity of each recorder.

While the preferred form of my invention has been illustrated and described it should be understood that variations will be apparent to one skilled in the art. Accordingly, it is intended that the invention not be limited to the specific form illustrated but that the claims appended hereto be given the broadest interpretation possible.

The embodiments of the invention in which an exclusive property or privilege is claimed are defined as follows:

1. An automatic standby device for a system of multiple recorder-transcribers and multiple dictate stations comprising a plurality of recorder-transcribers, a plurality of dictate stations positioned at locations remote from said recorder-transcribers, means operative to selectively interconnect a dictate station to a recorder-transcriber, sensing means operative in response to the amount of dictated but untranscribed tape in a recorder-transcriber reaching a predetermined per cent of the capacity of the recorder-transcriber; conditioning means operative in response to the operation of said sensing means for conditioning said recorder-transcriber to make it unavailable to be seized for subsequent dictation; and, override means operative in response to signals indicating that all other available recorder-transcribers are in use or full for making the recorder-transcriber available for seizure for subsequent dictation irrespective of said operation of said sensing means.

2. The automatic standby device of claim 1 further including a manually operated standby switch for also making a recorder-transcriber unavailable for seizure; said override means being operative in response to said signals indicating all other recorder-transcribers are full or in use for making the recorder-transcriber available for seizure irrespective of said standby switch.

3. An automatic standby device for a system of multiple recorder-transcribers and multiple dictate stations, comprising:

a plurality of recorder-transcribers;

a plurality of dictate stations;

means operative to selectively interconnect a dictate station to a recorder-transcriber;

first means operative in response to the amount of dictated but untranscribed tape in a particular one of said recorder-transcribers reaching a predetermined percent of the capacity of said particular recorder-transcriber; second means operative in response to said operation of said first means for rendering said particular recorder-transcriber unavailable to be seized for subsequent dictation; and override means responsive to the condition of the remainder of said recorder-transcribers being in use or full to make said particular recorder-transcriber available for seizure for subsequent dictation irrespective of said operation of said first means.

4. Apparatus as in claim 3, wherein said second means comprises circuit means associated with each of said recorder-transcribers and operative to enable seizure of the corresponding recorder-transcriber when said circuit means is in a first condition and operative to render such recorder-transcriber unavailable for seizure when said circuit means is in a second condition, said circuit means being operative in response to said first means responding to the amount of dictated but untranscribed tape reaching said predetermined percent to be placed in said second condition to render such recorder-transcriber unavailable for seizure.

5. Apparatus as in claim 4 wherein said circuit means is operative to be placed in said second condition in response to said recorder-transcriber being in use.

6. Apparatus as in claim 4 wherein said circuit means is operative to be placed in said second condition in response to all of the tape in said recorder-transcriber being dictated but untranscribed.

7. Apparatus as in claim 4 further comprising standby switch means operatively interconnected with each of said recorder-transcribers and operable to a first position in which the recorder-transciber associated with said standby switch means is normally available for said selective interconnection to a dictate station and operable to a second position wherein said circuit means assumes said second condition to render said recorder-transcriber unavailable for seizure by said selective interconnection said circuit means being operative in response to the condition of the remainder of said recorder-transcribers being in use or being full to assume said first condition to render said recorder-transcriber available for seizure irrespective of the position of said standby switch means.

8. Apparatus as in claim 4, wherein said circuit means is operative in response to a signal indicating that all other recorder-transcribers are in use or full to be placed in said first condition to enable seizure of the recorder-transcriber irrespective of the operation of said first means.

9. Apparatus as in claim 4, wherein said override means comprises a control circuit in communication with each of said plurality of recorder-transcribers, each of said recorder-transcribers being operative to place a first signal on said control circuit when the recorder-transcriber is unavailable to accept dictation and to place on said control circuit a second signal dissimilar to said first signal when such recorder-transcriber is available to accept dictation, standby switch means associated with each of said recorder-transcribers and selectively operable to a first position in which the recorder-transcriber is normally available to be seized for said selective interconnection to a dictate station and to a second position wherein said circuit means assumes said second condition to render said recorder-transcriber normally unavailable for seizure by said selective interconnection, said standby switch means when in said second position being operative to cause the circuit means of the recorder-transcriber associated with the standby switch means to be placed in said first condition in response to a first signal present on said control circuit and to be placed in said second condition in response to a second signal present on said control circuit.

10. Apparatus as in claim 9, wherein said second means of the recorder-transcriber associated with the standby switch means is operative when the dictated but untranscribed tape of such recorder-transcriber is less than said predetermined amount to enable control of said recorder-transcriber circuit means by said control circuit to occur responsive to the position of said standby switch means, and further is operative in response to said operation of said first means when the dictated but untranscribed tape of such recorder-transcriber exceeds said predetermined amount to enable control of said recorder-transcriber circuit means by said control circuit to occur irrespective of the position of said standby switch.

* * * * *